(12) United States Patent
Kwon et al.

(10) Patent No.: US 10,834,732 B2
(45) Date of Patent: *Nov. 10, 2020

(54) APPARATUS AND METHOD FOR TRANSMITTING AND RECEIVING DATA USING MULTI-PATH IN WIRELESS COMMUNICATION SYSTEM OF DISTRIBUTED MAC

(71) Applicant: Electronics and Telecommunications Research Institute, Daejeon (KR)

(72) Inventors: Hyoung Jin Kwon, Cheongju-si (KR); Jin Kyeong Kim, Daejeon (KR); Yong Sun Kim, Suwon-si (KR); Kyeongpyo Kim, Daejeon (KR); Seung Eun Hong, Daejeon (KR); Woo Yong Lee, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/396,839

(22) Filed: Apr. 29, 2019

(65) Prior Publication Data

US 2019/0254039 A1 Aug. 15, 2019

Related U.S. Application Data

(63) Continuation of application No. 15/864,932, filed on Jan. 8, 2018, now Pat. No. 10,278,188, which is a
(Continued)

(30) Foreign Application Priority Data

May 23, 2008 (KR) .................. 10-2008-0048102
Sep. 23, 2008 (KR) .................. 10-2008-0093425
(Continued)

(51) Int. Cl.
*H04W 72/08* (2009.01)
*H04B 7/155* (2006.01)
(Continued)

(52) U.S. Cl.
CPC ............ *H04W 72/08* (2013.01); *H04B 1/707* (2013.01); *H04B 7/155* (2013.01); *H04L 25/20* (2013.01);
(Continued)

(58) Field of Classification Search
CPC .. H04W 72/08; H04W 72/0426; H04L 25/20; H04L 43/50; H04L 47/10; H04B 1/707; H04B 7/155
See application file for complete search history.

(56) References Cited

U.S. PATENT DOCUMENTS

| 5,771,227 A | 6/1998 | Benayoun et al. |
| 6,636,496 B1 | 10/2003 | Cho et al. |

(Continued)

FOREIGN PATENT DOCUMENTS

JP 2003-244072 A 8/2003

*Primary Examiner* — Kiet Tang
(74) *Attorney, Agent, or Firm* — NSIP Law

(57) ABSTRACT

Provided is an apparatus and method for transmitting and receiving data using multiple paths in a wireless communication system using a distributed Media Access Control (MAC). More particularly, provided is an apparatus and method for transmitting and receiving data that may select a path with a better channel status from multiple paths that include a direct path using a Line of Sight (LOS) and a relay path passing through a relay apparatus, in a wireless communication system that may transmit data via the LOS using a distributed MAC and a directional antenna.

12 Claims, 13 Drawing Sheets

Related U.S. Application Data continuation of application No. 14/980,768, filed on Dec. 28, 2015, now Pat. No. 9,867,202, which is a continuation of application No. 12/470,609, filed on May 22, 2009, now Pat. No. 9,236,933.

(30) Foreign Application Priority Data

| Sep. 25, 2008 | (KR) | ......................... 10-2008-0093991 |
| May 20, 2009 | (KR) | ......................... 10-2009-0043920 |

(51) Int. Cl.

| *H04L 29/12* | (2006.01) |
| *H04L 12/18* | (2006.01) |
| *H04L 12/801* | (2013.01) |
| *H04B 1/707* | (2011.01) |
| *H04L 12/26* | (2006.01) |
| *H04L 25/20* | (2006.01) |
| *H04W 72/04* | (2009.01) |

(52) U.S. Cl.
CPC .............. *H04L 43/50* (2013.01); *H04L 47/10* (2013.01); *H04W 72/0426* (2013.01)

(56) References Cited

U.S. PATENT DOCUMENTS

| 2003/0016624 | A1* | 1/2003 | Bare ................. H04L 29/12009 370/217 |
| 2003/0202469 | A1 | 10/2003 | Cain |
| 2004/0165526 | A1 | 8/2004 | Yada et al. |
| 2004/0240405 | A1 | 12/2004 | Okazaji |
| 2006/0018309 | A1 | 1/2006 | Lee et al. |
| 2006/0062199 | A1* | 3/2006 | Yoshizawa .......... H04L 12/2854 370/351 |
| 2007/0190934 | A1* | 8/2007 | Kim .................... H04B 7/15557 455/7 |
| 2007/0268868 | A1* | 11/2007 | Singh ................. H04L 12/1863 370/331 |
| 2007/0286110 | A1* | 12/2007 | Proctor, Jr. ........ H04B 7/15521 370/315 |
| 2008/0056175 | A1 | 3/2008 | Jung et al. |
| 2008/0137585 | A1 | 6/2008 | Loyola et al. |
| 2008/0151913 | A1 | 6/2008 | El-Damhougy et al. |
| 2008/0170512 | A1 | 7/2008 | Hwang et al. |
| 2008/0194267 | A1* | 8/2008 | Ahn .................... H04B 7/15542 455/450 |
| 2009/0219852 | A1 | 9/2009 | Youn et al. |
| 2009/0232010 | A1 | 9/2009 | Li et al. |
| 2009/0233636 | A1* | 9/2009 | Trainin .................... H01Q 3/26 455/515 |
| 2010/0322140 | A1 | 12/2010 | Kwon et al. |
| 2011/0026427 | A1 | 2/2011 | Wang et al. |

* cited by examiner

FIG. 2

| Element ID | Information element | Description |
|---|---|---|
| 0 | Traffic Indication Map (TIM) IE | Indicates that a device has data buffered for transmission via PCA |
| 1 | Beacon Period Occupancy IE (BPOIE) | Provides information on neighbors' BP occupancy in the previous superframe |
| 2 | PCA Availability IE | Indicates the MASs that a device is available to receive PCA frames and transmit the required response |
| 3-7 | Reserved | Reserved |
| 8 | DRP Availability IE | Indicates a device's availability for new DRP reservations |
| 9 | Distributed Reservation Protocol (DRP) IE | Indicates a reservation with another device |
| 10 | Hibernation Mode IE | Indicates the device will go to hibernation mode for one or more superframes but intends to wake at a specified time in the future |
| 11 | BP Switch IE | Indicates the device will change its BPST at a specified future time |
| 12 | MAC Capabilities IE | Indicates which MAC capabilities a device supports |
| 13 | PHY Capabilities IE | Indicates which PHY capabilities a device supports |
| 14 | Probe IE | Indicates a device is requesting one or more IEs from another device or/and responding with requested IEs |
| 15 | Application-specific Probe IE | Indicates a device is requesting an Application-specific IE from another device |
| 16 | Link Feedback IE | Provides data rate and power control feedback |
| 17 | Hibernation Anchor IE | Provides information on devices in hibernation mode |
| 18 | Channel Change IE | Indicates a device will change to another channel |
| 19 | Identification IE | Provides identifying information about the device, including a name string |
| 20 | Master Key Identifier (MKID) IE | Identifies some or all of the master keys held by the transmitting device |
| 21 | Relinquish Request IE | Indicates that a neighbor requests that a device release one or more MASs from is reservations |
| 22 | Multicast Address Binding (MAB) IE | Indicates an address binding between a multicast EUI-48 and a McstAddr |
| 23-254 | Reserved | Reserved |
| 255 | Application-Specific IE(ASIE) | Use varies depending on the application |

FIG. 3

| Octet | Bit | Attribute | Description |
|---|---|---|---|
| 0 | 0 | PCA | Capable of transmitting and receiving frames using the PCA mechanism |
| | 1 | Hard DRP | Capable of being the owner and target of Hard DRP reservations |
| | 2 | Soft DRP | Capable of being the owner and target of Soft DRP reservations |
| | 3 | Block ACK | Capable of transmitting and acknowledging frames using the B-ACK mechanism |
| | 4 | Explicit DRP negotiation | Capable of negotiation a DRP reservation using command frames |
| | 5 | Hibernation anchor | Capable of acting as a hibernation anchor |
| | 6 | Probe | Capable of responding to Probe IEs received in command frames |
| | 7 | Link feedback | Capable of generating and interpreting a Link Feedback IE |
| 1 | 0 | Range measurement | Capable of Initiating and participating in range measurement calculations |
| | 1-7 | Reserved | Reserved |

FIG. 4

| Octet | Bit | Attribute | Description |
|---|---|---|---|
| 1 | 1 | Relay Capability (401) | Capable of relaying of Type A device |
| | 2 | Relay Support Capability (403) | Capable of supporting a relay link |

FIG. 5

| Octets:1 | 1 | 1 | 1 | 1 | 1 | 2 | 2 | 2 | 2 |
|---|---|---|---|---|---|---|---|---|---|
| Element ID | Length | Relay Command Type | Relay Control | R-D Link LQI | Relay Mode | Path Change Interval | Detour Start Duration | Relay DevAddr | Source DevAddr | Destination DevAddr |

| Value | Relay Command Type |
|---|---|
| 0 | Relay Reservation Request |
| 1 | Relay Reservation Response |
| 2 | Relay Set Request |
| 3 | Relay Set Response |
| 4 | Relay Complete Request |
| 5 | Relay Complete Response |
| 6 | Relay Switch Request |
| 7 | Relay Switch Response |

FIG. 7

| b7-b5 | b4-b1 | b0 |
|---|---|---|
| Reserved | Link Order | Relay Mode |

FIG. 8

| Value | Link order |
|---|---|
| 0000 | 0-1 |
| 0001 | 0-2 |
| 0010 | 0-1-2 |
| 0011 | 0-2-1 |
| 0100 - 1111 | Reserved |

FIG. 9

| octets : 1 | 0 or N |
|---|---|
| Feedback Control | Link Feedback |

| bit : b7-b6 | bit : b7-b6 | bit : b7-b6 |
|---|---|---|
| subtype | subtype | subtype |

| Value | Subtype | Description |
|---|---|---|
| 0 | Link Feedback Response | Provides feedback on with link quality metrics, and/or recommendation of rate and transmission power change in response to a link food back request |
| 1 | Link Feedback Request | Requests a sink device to provide link feedback |
| 2 | Transmit power and rate control | Recommends transmit power and rate change to a source device |

| Bit | Meaning | Description |
|---|---|---|
| 0 | TPRC | Bit set to ONE to indicate requesting for, or the existence of sink's recommendation on transmit rate and power change |
| 1 | LQI | Bit set to ONE to indicate requesting for, or the existence of feedback on LQI of the link |
| 2 | FER | Bit set to ONE to indicate requesting for, or the existence of feedback on frame loss/error rate of the link |

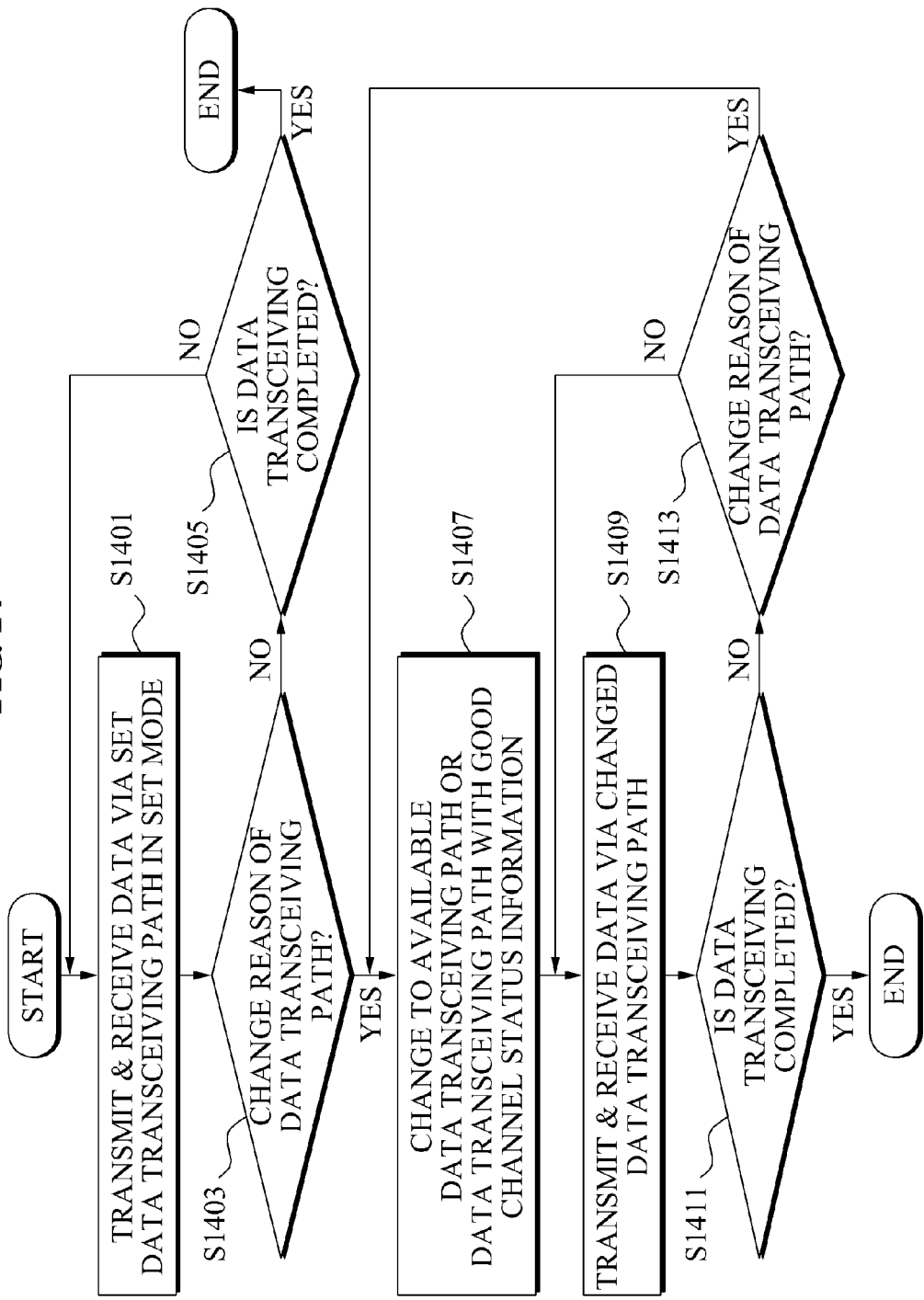

APPARATUS AND METHOD FOR TRANSMITTING AND RECEIVING DATA USING MULTI-PATH IN WIRELESS COMMUNICATION SYSTEM OF DISTRIBUTED MAC

CROSS-REFERENCE TO RELATED APPLICATIONS

This application is a Continuation Application of U.S. patent application Ser. No. 15/864,932, filed on Jan. 8, 2018, which is a Continuation Application of U.S. patent application Ser. No. 14/980,768, filed on Dec. 28, 2015, now U.S. Pat. No. 9,867,202 B2, issued on Jan. 9, 2018, which is a Continuation Application of U.S. patent application Ser. No. 12/470,609, filed on May 22, 2009, now U.S. Pat. No. 9,236,933 B2, issued on Jan. 12, 2016, which claims the benefit under 35 U.S.C. § 119(a) of Korean Patent Application No. 10-2008-0048102, filed on May 23, 2008, Korean Patent Application No. 10-2008-0093425, filed on Sep. 23, 2008, Korean Patent Application No. 10-2008-0093991, filed on Sep. 25, 2008, and Korean Patent Application No. 10-2009-0043920, filed on May 20, 2009, in the Korean Intellectual Property Office, the disclosures of which are incorporated herein by reference.

BACKGROUND

1. Field of the Invention

The present invention relates to an apparatus and method for transmitting and receiving data using multiple paths in a wireless communication system using a distributed Media Access Control (MAC). More particularly, the present invention relates to an apparatus and method for transmitting and receiving data that may select a path with a better channel status from multiple paths that include a direct path using a Line of Sight (LOS) and a relay path passing through a relay apparatus, in a wireless communication system that may transmit data via the LOS using a distributed MAC and a directional antenna.

2. Description of the Related Art

Due to channel characteristics, in a wireless communication system that may use a directional antenna rather than an omni antenna and also use a distributed Media Access Control (MAC), when a channel of a using path is blocked by a human being, an obstacle, and the like, a channel status may be significantly deteriorated, paralyzing a communication. For example, in the case of the wireless communication system in the band of 60 GHz, data may be exchanged at a very high speed of 3 Gbps. Therefore, although the data exchange is performed within a very short time, it may cause a serious problem. Accordingly, there is a need for a method that may smoothly exchange data without causing a blockage in the data exchange, although a human being or an obstacle exists in a Line of Sight (LOS) of the wireless communication system in the band of 60 GHz.

Also, when the direct path is disconnected, or when a channel status is deteriorated, a data transmission rate may decrease and thus it is possible to transmit data via a relay path. When a data transmission concept using multiple paths is expanded, a transceiver may transmit the data via a path with a most excellent channel status among the multiple paths.

Also, when a directional antenna is used, a communication between a transmission apparatus and a reception apparatus may not cause interference in a communication between another transmission apparatus and reception apparatus. As far as the interference is not affected, a spatial reuse capable of simultaneously transmitting data may be performed. In particular, when a distributed MAC is used, a transceiving apparatus may verify whether interference exists and then may allocate necessary resources without a central coordinator, and use the allocated resources.

A conventional scheme of using a relay apparatus may include a scheme of determining whether a path is disconnected based on an acknowledgement (ACK) signal with respect to a data reception check control for each path, using a directional antenna, and thereby using another path.

However, the conventional scheme makes a decision based on the ACK signal. Therefore, since the ACK signal may be transmitted but a channel status may be deteriorated, a data transmission may not be performed at a desired rate. In this case, the conventional scheme may not be applicable. Specifically, data may not be transmitted via a path with a most excellent channel status among multiple paths.

SUMMARY

An aspect of the present invention provides an apparatus and method that may transmit data via a path with a most excellent channel status, among multiple channels including a direct path and a relay path, in preparation for a case where a data transmission via a line of sight (LOS) becomes impossible, or a case where a desired data rate is not achieved due to a blockage of the LOS or a deteriorated channel status.

Another aspect of the present invention also provides an apparatus and method that may obtain link quality indication (LQI) information associated with each of paths including a direct path and a relay path, in order to select a path with a most excellent channel status.

According to an aspect of the present invention, there is provided a method of transmitting and receiving data in a wireless communication system using a distributed Media Access Control (MAC), the method including: transmitting and receiving the data to and from a relay apparatus or a destination device, in a mode set for an antenna training process and via a data transceiving path set for the antenna training process; determining whether a change reason of the data transceiving path occurs; changing the data transceiving path to an available data transceiving path or to another data transceiving path with channel status information better than a currently using data transceiving path, when the change reason of the data transceiving path occurs; and periodically verifying whether a previous data transceiving path is available, while transmitting and receiving the data via the changed data transceiving path.

According to another aspect of the present invention, there is provided an apparatus for transmitting and receiving data in a wireless communication system using a distributed MAC, the apparatus including: an association management unit to manage an association for setting a link with a relay apparatus and a destination device; a relay reservation management unit to perform a relay reservation process for transmitting the data via the relay apparatus; a data transceiving path selection unit to select, between a direct path and a relay path, a data transceiving path to transmit the data; a channel status management unit to manage a data channel status of the direct path and the relay path; and a communication unit to transmit and receive data via the selected data transceiving path.

Additional aspects, features, and/or advantages of the invention will be set forth in part in the description which follows and, in part, will be apparent from the description, or may be learned by practice of the invention.

Effect

According to embodiments of the present invention, one or more multiple paths may be set to pass through a relay apparatus. Through this, although a Line of Sight (LOS) path is blocked, it is possible to smoothly transmit and receive data.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIG. 2 illustrates a MAC capability information element (IE) in a distributed MAC for wireless network of WiMedia according to an embodiment of the present invention;

FIG. 3 illustrates a format of a bitmap of the MAC capability IE of FIG. 2;

FIG. 4 illustrates two fields added to a bitmap of a MAC capability IE according to an embodiment of the present invention;

FIG. 5 illustrates a format of a relay IE according to an embodiment of the present invention;

FIG. 6 illustrates a relay command type according to an embodiment of the present invention;

FIG. 7 illustrates relay mode information according to an embodiment of the present invention;

FIG. 8 illustrates a link order field type of FIG. 7;

FIG. 9 illustrates a link feedback command frame format according to an embodiment of the present invention;

FIG. 14 is a flowchart illustrating a method of transmitting and receiving data according to an embodiment of the present invention.

DETAILED DESCRIPTION

Figure 1:
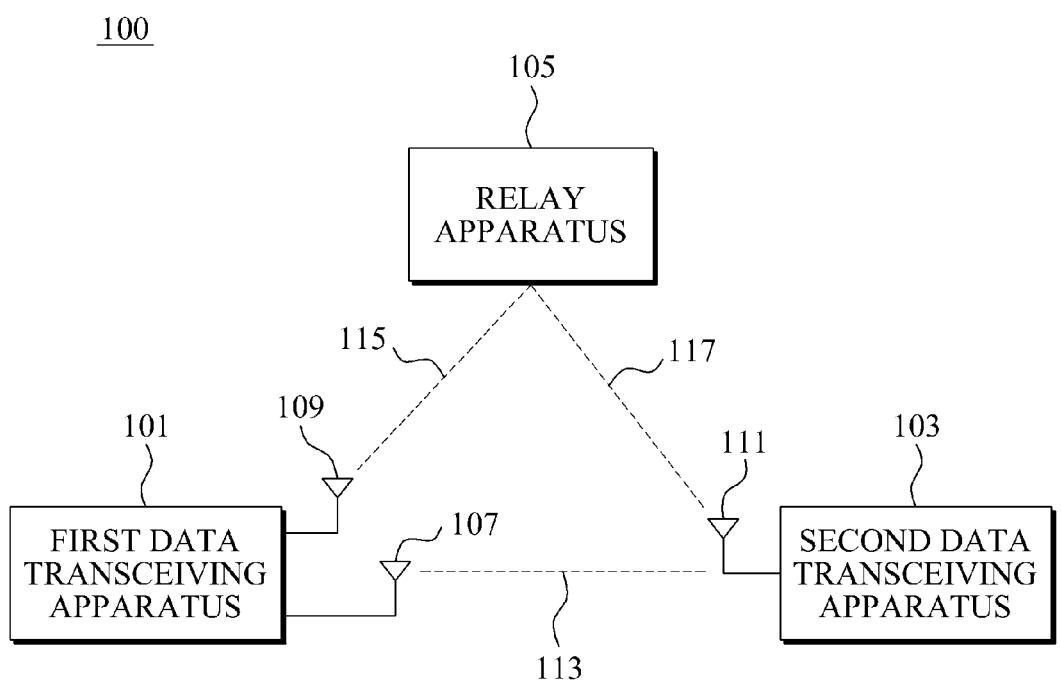
FIG. 1 is a block diagram illustrating a configuration of a wireless communication system using a distributed Media Access Control (MAC) according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Embodiments of the present invention may be applicable to a wireless communication system of 60 GHz or a THz band. Also, embodiments of the present invention may be applicable to a wireless communication system that may transmit data via a Line of Sight (LOS) using a distributed Media Access Control (MAC) and a directional antenna. Also, embodiments of the present invention may provide a technology that may smoothly transmit and receive data even when the LOS is blocked due to an obstacle, based on a distributed MAC technology for wireless networks of WiMedia.

Initially, the distributed MAC technology for wireless networks of WiMedia applicable to embodiments of the present invention will be briefly described.

In the distributed MAC for wireless networks technology of WiMedia, a MAC is fully distributed and a central coordinator does not exist. The distributed MAC technology may include two MAC schemes, for example, a Distributed Reservation Protocol (DRP) scheme and a Prioritized Contention Access (PCA) scheme. In the DRP scheme, each apparatus may generate a beacon group or an extended beacon group through a beacon exchange within a beacon period and thereby enable a contention-free reservation data communication in the generated beacon group or extended beacon group. A WiMedia MAC scheme according to an embodiment of the present invention may use the DRP scheme.

FIG. 1 is a block diagram illustrating a configuration of a wireless communication system 100 using a distributed MAC according to an embodiment of the present invention.

Referring to FIG. 1, the wireless communication system 100 may include a first data transceiving apparatus 101 corresponding to a source device, a second data transceiving apparatus 103 corresponding to a neighboring device, and a relay apparatus 105.

A conventional wireless communication system may perform data exchange between two transceiving apparatuses using only a direct path 113 via antennas 107 and 111 that is located in a Line of Sight (LOS).

However, the wireless communication system 100 may construct relay paths 115 and 117 using another antenna 109 and the particular relay apparatus 105 in addition to the direct path 113. The relay apparatus 105 may operate according to an amplify-and-forward scheme in order to avoid a collision between data transmitted and received via the relay paths 115 and 117, and data transmitted and received via the direct path 113.

For transmitting and receiving data using multiple paths, an initialization operation such as a path setting, an antenna training, and the like, may be required. Prior to describing the initialization operation, requirements of each device in the wireless communication system 100 will be described.

<1. Requirements of Each Device>

Referring to FIG. 1, the first data transceiving apparatus 101 corresponding to the source device and the second data transceiving apparatus 103 corresponding to the neighboring device may include a sector antenna or an array antenna that may support an omni-directional transmission. The source device may be unaware of where the neighboring device is located, before performing a device discovery. Therefore, the source device may need to inform the neighboring device about its existence through an omni directional transmission of a beacon.

Also, in the case of a data transmission instead of transmitting the beacon, the source device and the neighboring device may perform the data transmission in a particular direction, instead of the omni directions. In order to identify the omni directional transmission and the particular directional transmission, the source device and the neighboring device may classify a discovery channel enabling the omni directional transmission and a data channel enabling the directional transmission, and use a different protocol for each channel. The source device and the neighboring device may perform the device discovery and antenna training via the discovery channel. In the data channel, the source device and the neighboring device may transmit the data or a control/command frame such as a beacon directionally into an antenna training direction. Therefore, a data transceiving operation according to an embodiment of the present invention may increase a transmission gain and thereby enhance a throughput. Also, a spatial reuse may be performed.

<2. A Link Setting Process for Transmitting Data Via a Relay Apparatus>

According to an embodiment of the present invention, a data transceiving apparatus may perform the link setting process for transmitting data via the relay apparatus, as an initialization process. In the following description, a device to start each process is referred to as a source device. A target device to and from which the source device desires to transmit and receive data is referred to as a destination device. The destination device is any one of neighboring devices that are adjacent to the source device.

(1) An Association Process:

A source device may listen to a beacon of a neighboring device before transmitting a beacon of the source device. When the beacon is received from the neighboring device, the source device may decode the received beacon to generate a response beacon. In this instance, the source device may obtain, from the received beacon, a pointer that indicates a starting location of the response beacon, and an interval field that indicates an interval length. A media access scheme of a discovery channel may use a Carrier Sense Multiple Access with Collision Avoidance (CSMA/CA). Therefore, when a collision occurs in a beacon transmission, a device transmitting the beacon may back off and reattempt the beacon transmission. Next, the source device may transmit a command frame for an association to a destination device that desires the association among neighboring devices. When the destination device responds to the command frame, the association process with respect to a pair of devices may be completed. When the source device does not listen to any beacon, the source device may transmit its beacon. In this instance, when the source device desires to use a relay link, the source device may need to inform the destination device or a relay apparatus about that the source device desires to use the relay link. Initially, the source device may need to transmit data to a direct link, that is, a LOS link and even to a link towards the relay apparatus that may exist in any direction. Therefore, the source device may need a beam-forming antenna or a multi-sector antenna capable of transmitting data into multiple directions. When the above conditions are satisfied, the source device may use the relay link. When the source device desires to use the relay link, the source device may inform the relay apparatus and the destination device about a use of the relay link. The source device may inform about the use of the relay link using a field that indicates a relay capability of a MAC capability information element (IE).

FIG. 2 illustrates a MAC capability IE in a distributed MAC for wireless networks of WiMedia according to an embodiment of the present invention, FIG. 3 illustrates a format of a bitmap of the MAC capability IE of FIG. 2, and FIG. 4 illustrates two fields added to a bitmap of a MAC capability IE according to an embodiment of the present invention.

Referring to FIG. 4, a relay capability field 401 indicates whether a type A device may perform a relay function. When the type A device may perform the relay function, the relay capability field 401 is set to "1". The type A device denotes a device that may support antenna training and of which a communication distance is about 10 meters in a wireless communication system using the distributed MAC. A relay support capability field 403 indicates whether a device excluding the type A device may perform a data exchange using a relay link. When the device may perform the data exchange using the relay link, the relay support capability field 403 is set to "1". When the relay capability field 401 and the relay support capability fields 403 are not used, it may be considered that the relay function may not be performed.

A source device may set the relay support capability field 403 to "1" and then broadcast a beacon including the relay support capability field 403. When a destination device receiving the beacon may also support the relay link, the destination device may set the relay support capability field 403 to "1" in the same manner, and transmit the beacon to the source device. Only when the relay support capability field 403 is set to "1" in the received beacon, a relay apparatus may also set the relay capability field 401 to "1".

(2) A Relay Reservation Process:

In (1) the association process, when a pair of devices corresponding to a source device and a destination device performing the association process may use a relay function and a relay apparatus exists in a network, the source device and the relay apparatus may perform a relay reservation process. In order to use the relay apparatus, the source device may transmit a command frame to the relay apparatus to verify whether the relay apparatus is available. The source device may need to receive a response frame with respect to the command frame. Also, when the relay apparatus receives the command frame from the source device regarding whether the relay apparatus is available, and in this instance, the relay apparatus is available, the relay apparatus may transmit its response to the source device, and may reserve the relay apparatus for the pair of devices performing the association process. Whether the relay apparatus may support a relay of another pair of devices may depend on the remaining resources. According to an embodiment of the present invention, it is assumed that the relay apparatus supports only a single pair of devices and relays only a device that initially requests a relay reservation. In this case, when a relay for the pair of devices is reserved, another pair of devices may not be supported. Accordingly, although a beacon where the relay support capability field 403 is set to "1", or although a relay request command frame is received from another device, the relay apparatus may not respond thereto.

Here, like the command frame requesting whether the relay apparatus is available, there is a need to newly define relay related information that is required for a relay operation. In an embodiment of the present invention, a new IE, that is, a relay IE is defined. The relay IE may be transferred using the beacon or a command frame for the relay IE. The relay IE may be newly defined using any one of IEs shown in FIG. 2.

FIG. 5 illustrates a format of a relay IE according to an embodiment of the present invention, and FIG. 6 illustrates a relay command type according to an embodiment of the present invention.

The relay IE of FIG. 5 may be used when requesting a command frame and a response frame in order to perform relay operations such as a relay reservation, a relay set, a relay complete, and a relay switch.

Referring to FIG. 5, the relay IE may include a relay command type field 501 and may set a command type according to a value of the relay command type field 501. In FIG. 5, an R-D link LQI field 503 denotes a field that indicates a link quality indication (LQI) value between a relay apparatus and a destination device. In this instance, the R-D link LQI field 503 may be used when the destination device informs a source device about an LQI of a relay-destination link. Also, a relay mode field 505 denotes a field that indicates a transmission mode. A path change interval field 507 denotes a filed that is set together when the transmission mode is set, and indicates whether to change a data transceiving path.

The command frame requesting whether the relay apparatus is available corresponds to a relay reservation request command frame where a value of the relay command type is zero in FIG. 6. In order to inform the relay apparatus about with which pair of devices to perform the association process, the source device may determine a source identification (ID) and a destination ID in the relay IE of FIG. 5, and thereby transmit the determined source ID and the destination ID to the relay apparatus. The relay apparatus may transmit a relay reservation response command frame of FIG. 6 to the source device.

(3) An Antenna Training Process Between a Source Device and a Destination Device:

An antenna training process denotes a process of exchanging antenna parameters in order to enhance a link performance between communication apparatuses. Generally, a communication apparatus to perform the antenna training process may select a sector, or may adjust a transmit and receive beam pattern through the antenna training process.

Initially, a source device and a destination device may perform the antenna training process. In this instance, the antenna training process between the source device and the destination device may be performed as the same as a conventional antenna training process that is performed without a relay apparatus. In order to avoid interference caused by a beacon transmitted from another device during the antenna training process, the source device and the destination device may reserve an interval for transmitting and receiving a training sequence using a request to train (RTT)/clear to train (CTT) and may inform about the reservation prior to the antenna training.

In order to reserve antenna training for two links formed with the relay apparatus, the source device and the destination device may reserve triple intervals in comparison to an existing reserved interval, for example, four times more than a time required to transmit and receive a pair of training sequences. More specifically, the source device and the destination device may make a reservation by considering the RTT/CTT and the command frame that is inserted to perform the antenna training process.

(4) An Antenna Training Process Between a Source Device and a Relay Apparatus:

When an antenna training process with a destination device is completed, a source device may transmit a relay set request command frame of FIG. 6 to a relay apparatus using the relay IE before the antenna training process with the relay apparatus is performed. Specifically, the source device may transmit, to the relay apparatus, a relay IE where a value of the relay command type is set to "2" in FIG. 6. In this instance, the relay IE may include relay mode information as shown in FIG. 7. The relay mode information indicates selecting any one of a normal mode and an alternative mode when data is transmitted. FIG. 8 illustrates a link order field type of FIG. 7.

The normal mode denotes a mode to transmit and receive data via a single path. For example, when the transmission mode is set to the normal mode and a direct path is used, a device may continuously transmit and receive the data via the direct path as far as the direct path is blocked or a channel degradation and the like does not occur.

The alternative mode denotes a mode to alternatively adopt a data transceiving path using a time duplex scheme. Within a path change interval, the source device may transmit and receive the data using only a single data transceiving path. The path change interval denotes a time duration based on a Medium Access Slot (MAS) unit. The source device may transmit information required for the alternative mode to the destination device and the relay apparatus, using the relay mode field 505 and the path change interval field 507.

The relay apparatus may set the relay IE to a relay set response command frame of FIG. 6, and respond to the source device. Next, the source deice may set, in an RTT, a duration field for protection of antenna training to be longer by twice than the existing reserved interval and thereby transmit the relay set response command frame to the relay apparatus. When a CTT is received from the relay apparatus, the source device may perform the antenna training process with the relay apparatus.

(5) A Data Transceiving Path Selection Process:

In order to verify whether two links passing through a relay apparatus are completely set after an antenna training process with the relay apparatus is performed, a source device may transmit a relay complete request command frame of FIG. 6 to a destination device. In this instance, the source device may include, in the relay complete request command frame, relay mode information as shown in FIG. 7 and thereby transmit the relay complete request command frame to the destination device.

When the relay complete request command frame is received, the destination device may set a duration field of an RTT to have the same length as an existing length and thereby transmit the relay complete request command frame to the relay apparatus. When a CTT is received from the relay apparatus, the destination device may perform the antenna training process with the relay apparatus.

When the antenna training process between the destination device and the relay apparatus is completed, the destination device may transmit a relay complete response command frame of FIG. 6 to the source device. The relay complete response command frame may include LQI information between the relay apparatus and the destination device. Specifically, the relay complete response command frame may include the R-D link LQI field 503. In this instance, the R-D link LQI field 503 may include an LQI value between the relay apparatus and the destination device.

When a relay complete response command frame is received from the destination device, the source device may determine via which path between a direct path and a relay path to transmit data. Initially, the source device may calculate channel status information associated with the relay path using two links, that is, a source-relay link and a relay-destination link that constitute the relay path.

Here, the source device may obtain an LQI between the source device and the relay apparatus using the result of a beam-forming process, and may also obtain an LQI between the relay apparatus and the destination device using the R-D link LQI field 503. Also, an algorithm of determining a channel status using an S-L link LQI and an R-D link LQI may be determined using various types of schemes. For example, a value that indicates a worse link between the S-L link LQI and the R-D link LQI may be determined as the channel status to the relay path. The source device may compare channel status information of the relay path with LQI information of the direct path to thereby transmit the data via a path with a better channel status.

When a transmission mode is set to an alternative mode, the source device may determine an appropriate MAS for each path. Also, when a beam-forming procedure of the direct path fails, a channel status may not be obtained. Even in this case, when a beam-forming procedure of two links of the relay path succeeds, the source device may transmit data via the relay path. Specifically, according to an embodiment of the present invention, when two devices desire to communicate with each other but may not perform a communication since a LOS path is not formed due to a far distance between the two devices or a bad channel status, the two devices may transmit and receive data via a relay path that uses a relay apparatus. Accordingly, it is possible to extend an existing system coverage.

(6) A Channel Scanning Process:

A source device may switch from a discovery channel to a data channel together with a destination device and a relay apparatus, and thereby perform a channel scanning process to determine whether a data transmission is possible. The channel scanning process denotes a process of switching to the data channel to listen to a signal in an antenna trained direction. During the channel scanning process, each device may sense a signal during an interval greater than or equal to a minimum at least one superframe. When the signal is not sensed, it may be assumed that a corresponding channel has no previous data communication in a corresponding direction. With this assumption, any one of the source device and the destination device may initiate a beacon period. Next, each device may perform a DRP negotiation process for a DRP reservation within a beacon period, allocate a DRP to a beacon, and prepare a data transmission. When using the relay apparatus, a channel listening process may be performed even with respect to a link direction via the relay apparatus. Accordingly, each device may perform the channel listening process with respect to all of two directions formed in a corresponding device. Only when the signal is not sensed in any of six directions, the corresponding channel may be used. Otherwise, that is, when the signal is sensed in any one of the six directions, each device may switch to another channel and iterate the channel scanning process.

<3. An Operation Followed by a Link Setting Process>

When a link setting process to transmit data via a relay apparatus is completed, a source device, a destination device, and the relay apparatus may form a superframe in a data channel, and transmit and receive a beacon in a beacon period. In the data channel, each device may directionally transmit a frame. Therefore, respective two beacon slots may need to be allocated according to a transmission direction. It is different from a conventional WiMedia MAC. The source device may perform a DRP negotiation with the destination device and the relay apparatus, using a DRP IE. When Target/Owner DevAddr of a DRP related IE matches the associated source device and destination device, the relay apparatus may move to a MAS by a DRP reservation, and relay a data transmission between the source device and the destination device.

<4. Determining Whether a Using Data Transceiving Path is Valid>

In a DRP interval, a data exchange process may be performed using a path and a mode that are set after an antenna training process. Whether a using data transceiving path is valid may be determined using the following two schemes.

A first scheme may make a decision depending on whether an acknowledgement (ACK) frame with respect to a data frame transmitted from a source device is received.

A second scheme may make a soft decision using a channel status. Specifically, the second scheme may compare channel status information with a predetermined threshold value, and determine whether a using path is blocked. The channel status information may include, for example, a received signal strength indication (RSSI) value, a signal-to-noise ratio (SNR) value, and the like, that are included in a response command, using a link feedback request/response command.

As an extended scheme of the second scheme, when an ACK policy is a delayed ACK or a block ACK, the extended scheme may compare a retransmission request subframe ratio or a frame error rate (FER) with the predetermined threshold value, and determine whether the using path is valid. The retransmission request subframe ratio indicates that subframe data is broken.

Also, whether the using path is valid may be determined using both the first scheme and the second scheme. When there is a retransmission rule, it is possible to use the transmission rule in interoperation with the above schemes.

When the using path is invalid according to the above scheme, the source device may change the path. In the case of the first scheme, when a transmission mode is set to a normal mode, the source device may transmit data via a path that is selected from a list of available links according to a predetermined rule. When the transmission mode is set to an alternative mode, the source device may change to a subsequent path of a link order filed and retransmit data where ACK is not received. In the case of the second scheme, the data exchange is possible and thus the source device may determine the path by writing a path link ID that the source device desires to change to as the using path, and by exchanging a relay switch command frame. Accordingly, the second scheme may not use an implicit scheme but may use only an explicit scheme using a command frame.

<5. Link Feedback Process>

Unlike data transceiving via a direct path, data transceiving via a relay apparatus may need an LQI of two links, that is, a source-relay link and a relay-destination link, in order to adaptively change a modulation and coding according to a channel status.

When transmitting data, the relay apparatus may operate according to an amplify-and-forward scheme. Accordingly, when a scheme used for a direct path is applied to a relay path as is, each device may obtain information where statuses of the two links and a relay gain are added and thus may inaccurately operate. In order to solve the above problem, a link feedback request/response command frame in a frame format as shown in FIG. 9 may be used.

FIG. 9 illustrates a link feedback command frame format according to an embodiment of the present invention.

Referring to FIG. 9, a source device may transmit a link feedback request command frame to a destination device. The destination device may contain a link quality status value in a link feedback response command, and thereby transmit the link feedback response command to the source device.

Figure 10:
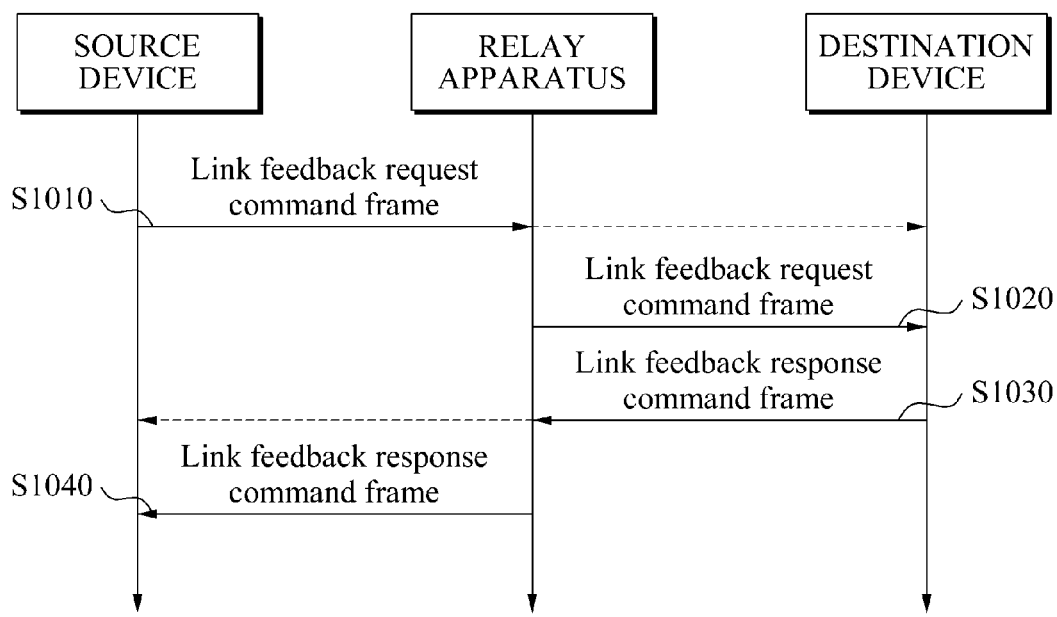
FIG. 10 illustrates a relay link feedback process according to an embodiment of the present invention.

FIG. 10 illustrates a relay link feedback process according to an embodiment of the present invention.

Referring to FIG. 10, when a source device desires to be aware of channel status information of a relay path, the source device may transmit a link feedback request command frame to a relay apparatus in operation S1010. In operation S1020, the relay apparatus receiving the link feedback request command frame may transmit another link feedback request command frame to a destination device. The relay apparatus may calculate an LQI between the source device and the relay apparatus. In response to the link feedback request command frame, the destination device may include an LQI between the relay apparatus and the destination device, and thereby transmit a link feedback response command frame in operation S1030. When the link feedback response command frame is received from the destination device, the relay apparatus may include LQI information of a worse link between the source-relay LQI and the relay-destination LQI and thereby transmit the link feedback response command frame to the source device in operation S1040.

<6. A Data Transceiving Path Changing Interval>

When a path is blocked in a data channel, a source device and a destination device may change to another path, and transmit and receive data. When a timeout event occurs in a local timer included in each of the source device and the destination device, the source device and the destination device may change a data transceiving path. In this instance, since a time to change the data transceiving path is different between the source device and the destination device, a sync problem may occur between the source device and the destination device. Specifically, data transmitted from the source device in the changed data transceiving path may not be received by the destination device.

In order to solve the sync problem, according to an embodiment of the present invention, a change of the data transceiving path may be allowed only in a MAS corresponding to a predetermined period among MASs reserved by the source device, the relay apparatus, and the destination device. Here, the predetermined period may be shared in such a manner that the source device informs the relay apparatus and the destination device about a path change interval value prior to the data transmission.

Hereinafter, with the assumption that a transmission mode is set to an alternative mode, an embodiment of the present invention will be described.

Figure 11:
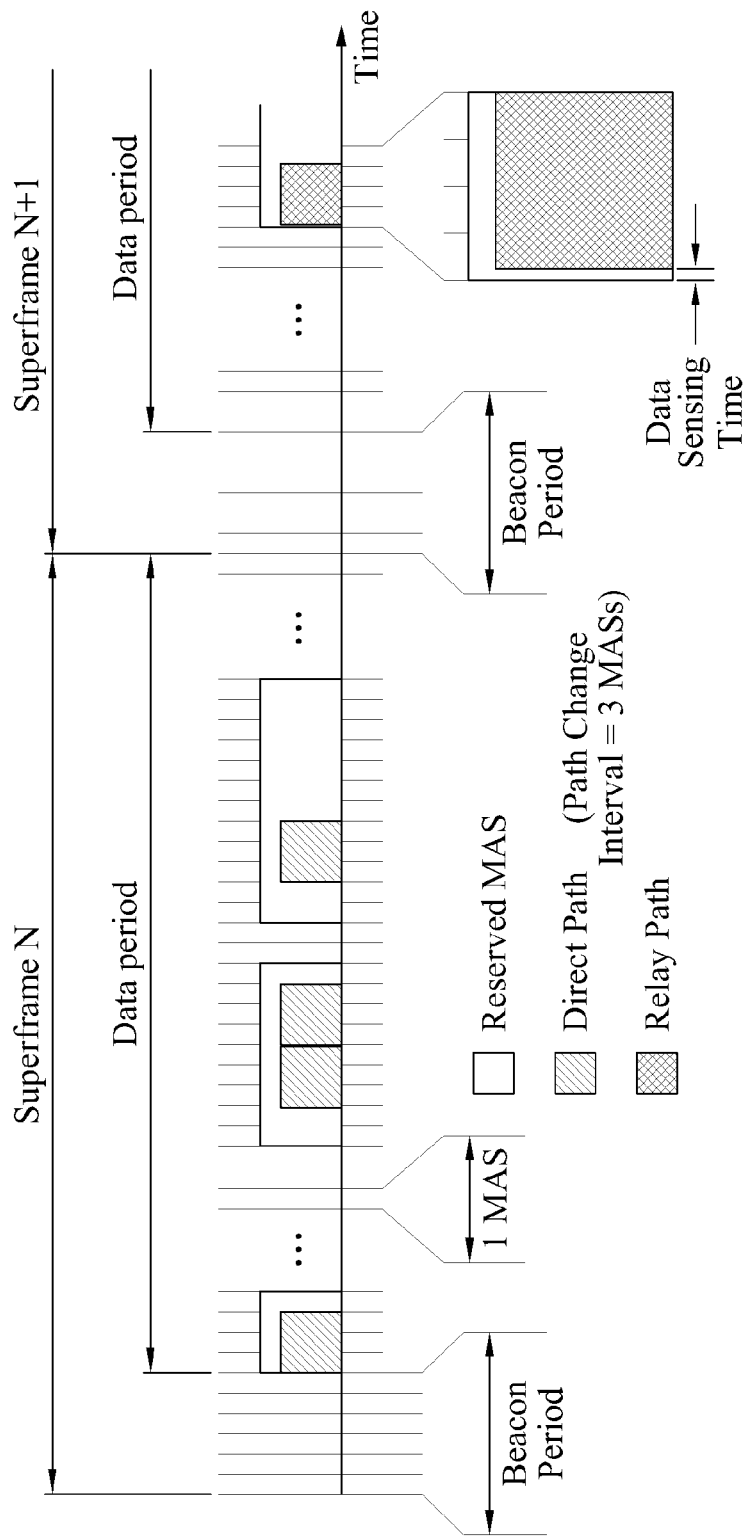
FIG. 11 illustrates an example of transmitting data in an alternative mode according to an embodiment of the present invention.

FIG. 11 illustrates an example of transmitting data in an alternative mode according to an embodiment of the present invention. The alternative mode indicates a mode to transmit data alternatively using a path. In this instance, a corresponding period may be determined based on a path change interval. Referring to FIG. 11, the path change interval is 3 MASs and data is transmitted by changing the path for each path change interval. Therefore, when previous data is not appropriately transferred, a source device may retransmit the previous data in a changed path.

Figure 12:
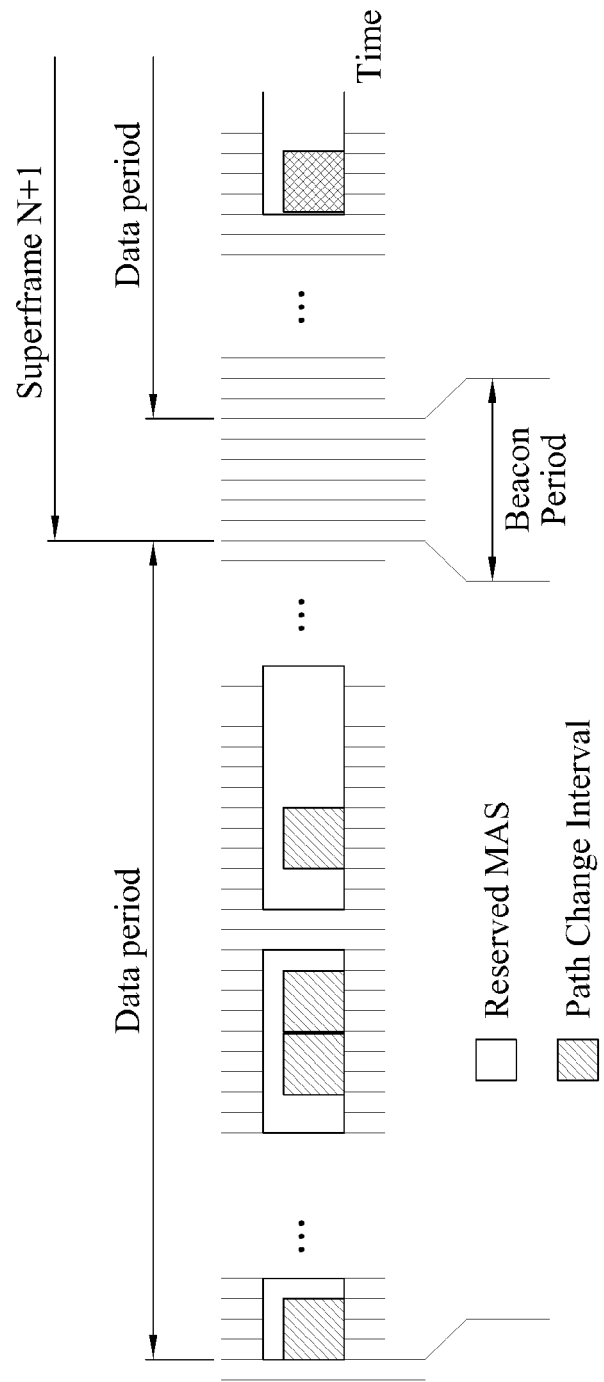
FIG. 12 illustrates an example of transmitting data in a normal mode according to an embodiment of the present invention.

FIG. 12 illustrates an example of transmitting data in a normal mode according to an embodiment of the present invention. In the normal mode, as far as a channel status of a using data transceiving path is not deteriorated, or as far as the using data transceiving path is not blocked, a source device may not change the using data transceiving path. However, when a change reason of the data transceiving path occurs, the source device may change the data transceiving path in a subsequent path change interval, and transmit data via the changed data transceiving path. In this instance, the destination device may be unaware of that the data transceiving path is changed. Accordingly, in the subsequent path change interval, the source device may transmit data after a predetermined period of time is elapsed, instead of immediately transmitting the data. In this case, the destination device may wait in a previous data transceiving path without being aware of that the data transceiving path is changed in the subsequent path change interval. Since the data is not received after the predetermined period of time is elapsed, the destination device may change the data transceiving path. In order to match a sync between the source device and the destination device, the destination device may change the data transceiving path after the predetermined period of time, defined as a data sensing time, is elapsed. The source device may transmit data after a time based on the data sensing time and a switching time is elapsed. Accordingly, the destination device may initially wait in the changed data transceiving path and thus match the sync with the source device.

<7. Scanning of an Unused Data Transceiving Path>

When a data transceiving path is switched from a direct path to a relay path or from the relay path to the direct path, a source device may execute a timer to verify whether a previous data transceiving path is available. The source device may periodically verify whether an unused path is available using the timer. When the unused path is the relay path, the source device may obtain channel status information through a relay link feedback process of the aforementioned link feedback process. When the unused path is the direct path, the source device may use a link feedback request/response command as shown in FIG. 9. When channel status information of the unused path is better than the channel status information of a currently using path, the source device may change the data transceiving path to the unused path. Otherwise, the source device may continuously transmit data in the current data transceiving path.

<8. Example of a Configuration of a Data Transceiving Apparatus>

Figure 13:
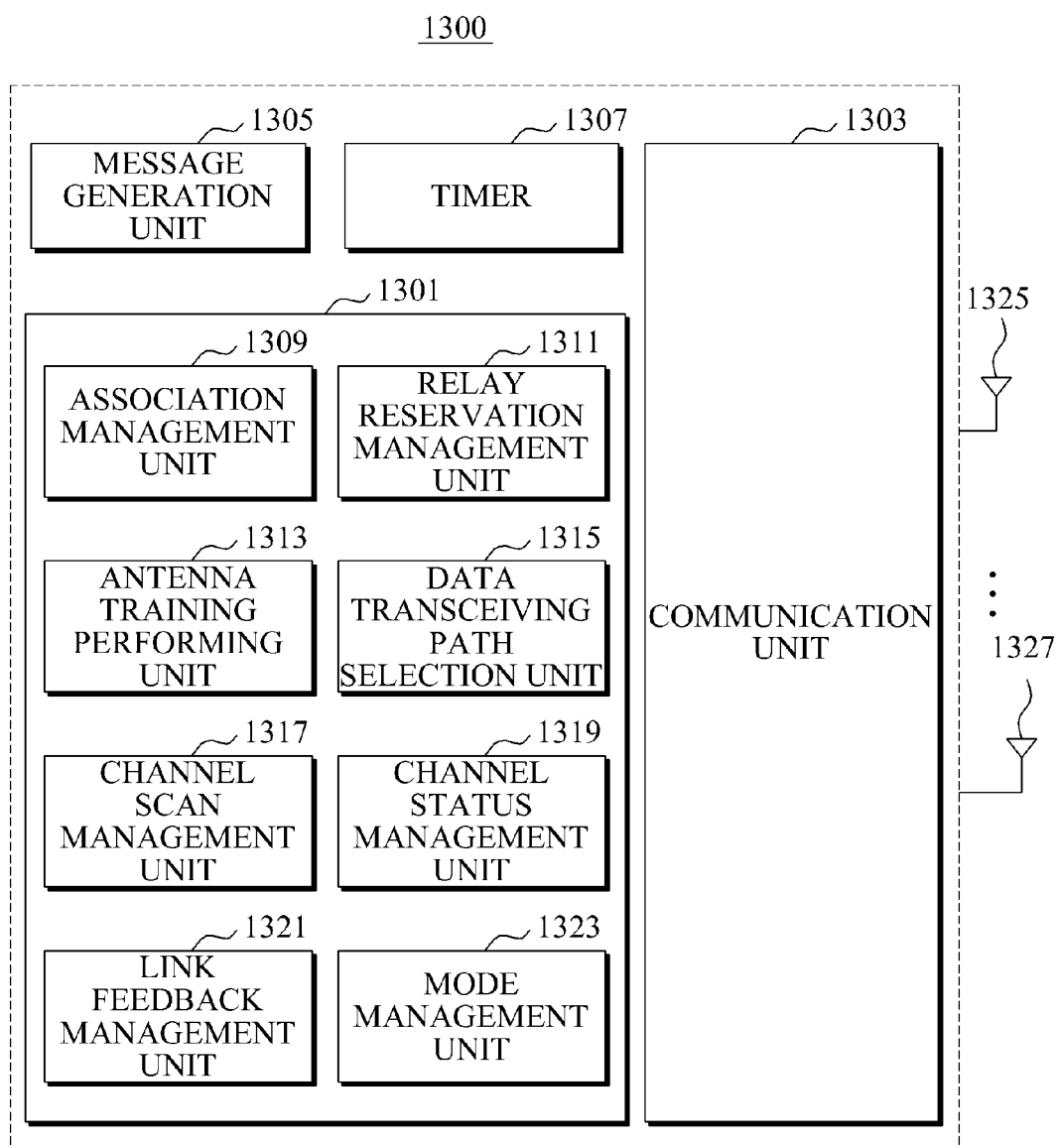
FIG. 13 is a block diagram illustrating a configuration of a data transceiving apparatus according to an embodiment of the present invention.

FIG. 13 is a block diagram illustrating a configuration of a data transceiving apparatus 1300 according to an embodiment of the present invention. The data transceiving apparatus 1300 may be applicable to the first data transceiving apparatus 101 and the second data transceiving apparatus of FIG. 1.

Referring to FIG. 13, the data transceiving apparatus 1300 may include a control unit 1301 to control general operations of the data transceiving apparatus 1300, a communication unit 1303 to transmit and receive a command frame and data, and a message generation unit 1305 to generate a message such as the command frame, the data, and the like. Also, when a data transceiving path is changed, the data transceiving apparatus 1300 may further include a timer 1307 to verify whether a previous data transceiving path is available. Also, the data transceiving apparatus 1300 may further include an antenna 1325 capable of forming a beam, or a multi-sector antenna 1327 capable of multi-directionally transmitting data.

The control unit 1301 may perform a link setting process, an operation followed by the link setting process, a link feedback process, a change of a data transceiving path, and scanning of an unused path. In this instance, the control unit 1301 may be configured into a single module. As shown in FIG. 13, the control unit 1301 may include an association management unit 1309, a relay reservation management unit 1311, an antenna training performing unit 1313, a data transceiving path selection unit 1315, a channel scan management unit 1317, a channel status management unit 1319, a link feedback management unit 1321, and a mode management unit 1323.

The association management unit 1309 may control (1) the association process of the link setting process in order to transmit data via a relay apparatus (not shown). For example, the association management unit 1309 may decode a beacon received from a neighboring device, and generate a response beacon. Also, when it is possible to perform data exchange using a relay link, the association management unit 1309 may set the relay support capability field 403 of FIG. 4 to "1".

The relay reservation management unit 1311 may control (2) the relay reservation process of the link setting process in order to transmit data via the relay apparatus. For example, the relay reservation management unit 1311 may control the communication unit 1303 and the message generation unit 1305 to transmit, to the relay apparatus, a command frame regarding whether the relay apparatus is available. Also, the relay reservation management unit 1311 may control the message generation unit 1305 to generate the relay IE as shown in FIG. 5.

The antenna training performing unit 1313 may perform (3) and (4) the antenna training process of the link setting process in order to transmit data via the relay apparatus. For example, the antenna training performing unit 1313 may control a process of reserving an interval for transmitting and receiving a training sequence using an RTT/CTT in order to avoid interference caused by a beacon transmitted from another device during the antenna training process, and of informing about the above event prior to the antenna training. Also, the antenna training performing unit 1313 may control the communication unit 1303 and the message generation unit 1305 to transmit the relay set request command frame of FIG. 6 to the relay apparatus.

The data transceiving path selection unit 1315 may control (5) the data transceiving path selection process of the link setting process, and an operation of the data transceiving apparatus 1300 in a change interval of the data transceiving path. For example, when a relay complete response command frame is received from the destination device, the data transceiving path selection unit 1315 may determine via which path between a direct path and a relay path to transmit data. Also, when a currently using data transceiving path is blocked or a channel status is deteriorated, the data transceiving path selection unit 1315 may control the communication unit 1303 to change the data transceiving path.

The channel scan management unit 1317 may control (6) the channel scanning process of the link setting process to transmit data via the relay apparatus. For example, in order to switch from a discovery channel to a data channel, and to determine whether a data transmission is possible, the channel scan management unit 1317 may control the communication unit 1303 to perform channel scanning. Also, the channel scan management unit 1317 may perform a DRP negotiation process for a DRP reservation, and may also perform an operation of allocating a DRP to a beacon and preparing the data transmission. Also, the channel scan management unit 1317 may control an operation of the data transceiving apparatus 1300 for scanning of an unused path.

The channel status management unit 1319 may manage a channel status of each data transceiving path in the link setting process and the operation followed by the link setting process. For example, the channel status management unit 1319 may obtain and manage LQI information of each link, compare channel status information with a predetermined threshold value, and determine whether a using path is blocked. The channel status information may include such as an SNR value, an RSSI value, and the like, of an LQI field included in a response command frame. Also, the channel status management unit 1319 may compare a retransmission request subframe ratio or an FER with the predetermined threshold value and determine whether the using path is valid. In this instance, when a channel status of a currently using data transceiving path is relatively inferior to a channel status of an unused data transceiving path, the channel status management unit 1319 may request the data transceiving path selection unit 1315 to change the data transceiving path.

The link feedback management unit 1321 may control the link feedback process. For example, the link feedback management unit 1321 may control the communication unit 1303 and the message generation unit 1305 to transmit the link feedback request command frame of FIG. 9 to the destination device. Also, the link feedback management unit 1321 may control the data transceiving apparatus 1300 to perform the link feedback process of FIG. 10.

The mode management unit 1323 may control the data transceiving apparatus 1300 to operate in a normal mode or an alternative mode according to a setting.

The communication unit 1303 may transmit and receive data via the selected data transceiving path according to a control of the control unit 1301. The communication unit 1303 may transmit and receive a command frame and a beacon.

The message generation unit 1305 may generate the command frame and data according to the control of the control unit 1301.

The timer 1307 may operate according to the control of the control unit 1301 and inform the control unit 1301 about when a timeout event occurs.

<9. A Relay Apparatus>

According to an embodiment of the present invention, a relay apparatus may use all the relay schemes to support a relay path. For example, the relay apparatus may operate according to an amplify-and-forward scheme that may amplify a signal received via one of two RF chains and then forward the amplified signal to another RF chain, and may also simultaneously decode the signal. Also, the relay apparatus may use a scheme that may decrease noise in the received signal using a quantization scheme and the like before amplifying the signal, and then amplify and forward the signal.

<10. A Data Transceiving Method>

FIG. 14 is a flowchart illustrating a method of transmitting data according to an embodiment of the present invention.

The data transceiving method of FIG. 14 may be performed by a data transceiving apparatus according to an embodiment of the present invention, as shown in FIG. 13. The data transceiving method may be performed when beams are formed in all of a source device, a relay apparatus, and a destination device.

Referring to FIG. 14, the data transceiving apparatus may transmit and receive data via a set data transceiving path in a set mode. The set mode indicates any one of an alternative mode and a normal mode. Also, the alternative mode or the normal mode may be determined during an antenna training process. The set data transceiving path indicates a data transceiving path that is determined during the antenna training process. The alternative mode indicates a mode to transmit and receive data via any one data transceiving path between a direct path and a relay path.

In operation S1403, the data transceiving apparatus may determine whether a change reason of the data transceiving path occurs. The change reason of the data transceiving path may correspond to a blockage of a data transceiving, a case where channel status information is deteriorated, or a case where channel status information of an unused data transceiving path is better than channel status information of a currently using data transceiving path. The data transceiving apparatus may determine whether the change reason of the data transceiving path occurs according to the aforementioned scheme in <4. Whether the using data transceiving path is valid>. When the change reason of the data transceiving path occurs in operation S1403, the data transceiving apparatus may perform operation S1407. Conversely, when the change of the data transceiving path occurs, the data transceiving apparatus may go to operation S1405.

When the data transceiving is completed in operation S1405, the data transceiving apparatus may terminate the data transceiving procedure. Conversely, when the data transceiving is not completed, the data transceiving apparatus may iterate operation S1401.

In operation S1407, the data transceiving apparatus may change the data transceiving path to an available data transceiving path or another data transceiving path with channel status information better than a currently using data transceiving path. When both a direct path and a relay path are not blocked and the channel status information is insufficient to transmit the data, the data transceiving apparatus may set a data transmission rate to be less than or equal to a predetermined value. Through this, the data transceiving apparatus may continue the data transmission.

In operation S1409, the data transceiving apparatus may continuously transmit and receive data via the changed data transceiving path.

When the data transceiving is completed in operation S1411, the data transceiving apparatus may complete the data transceiving procedure. Conversely, when the data transceiving is not completed in operation S1411, the data transceiving apparatus may perform operation S1413. In this instance, operation S1411 is an operation for periodically verifying whether a previous data transceiving path is available when the data transceiving path is switched from a direct path to a relay path or from the relay path to the direct path. Accordingly, operations S1409 through S1413 may be set to be periodically performed using the timer.

In operation S1413, the data transceiving apparatus may determine whether the change reason of the data transceiving path occurs again. In this instance, as described above, the change reason of the data transceiving path may correspond to a blockage of data transceiving, a case where the channel status information is deteriorated, or a case where channel status information of an unused data transceiving path is better than channel status information of a currently using data transceiving path. Accordingly, when the channels status information of the previous data transceiving path is better, the data transceiving apparatus may change again to the data transceiving path set in operation to thereby transmit and receive data. The data transceiving method according to an embodiment of the present invention may scan an unused data transceiving path according to the aforementioned scheme in <7. Scanning of the unused path>.

Although embodiments of the present invention describe a process of setting a relay path with a single relay apparatus, but the present invention is not limited thereto. Specifically, the present invention may be applied when setting a relay path with a plurality of relay apparatuses. Also, the relay apparatuses may be separated away from a source device and a destination device and thus the relay path may be set using a multi-hop scheme by connecting two or more relay apparatuses in series.

The data transmitting and receiving method according to the above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method of transmitting data, performed by a source device in a wireless communication system, the method comprising:
   identifying whether a relay mode of a relay device is a Full Duplex Amplify-and-Forward (FD-AF) mode;
   identifying a transmission mode of the relay device when the relay mode is the FD-AF mode; and
   transmitting data using a data link determined according to the transmission mode of the relay device,
   wherein the data link is a direct link or a relay link,
   wherein the direct link is for exchanging the data directly between the source device and a destination device without the relay device,
   wherein the relay link is for exchanging the data between the source device and the destination device via the relay device,
   wherein, when the transmission mode is a normal mode, the data is transmitted using the data link which is not changed until the data link is determined to become unavailable due to blockage or channel degradation, and
   wherein, when the transmission mode is an alternative mode, the data is transmitted using the data link which is determined by changing between the direct link and the relay link at each link change interval.

2. The method of claim 1, wherein the source device transmits a beacon frame for a device discovery using omni-directional transmission, and transmits a data frame using directional transmission.

3. The method of claim 1 further comprising:
   changing the data link based on a status of the data link, wherein the data link is changed after a data sensing time from a start of a next link change interval.

4. The method of claim 3, wherein the changing is performed, when the data link is unavailable due to a blockage or channel degradation.

5. The method of claim 3, wherein the changing is performed when the source device transmits a frame to the destination using the direct link or the relay link but does not receive an ACK (Acknowledge) frame.

6. The method of claim 1, wherein the data link is selected based on an antenna training using a beacon.

7. A source device in a wireless communication system, the source device comprising:
a processor configured to:
identify whether a relay mode of a relay device is a Full Duplex Amplify-and-Forward (FD-AF) mode;
identify a transmission mode of the relay device when the relay mode is the FD-AF mode; and
transmit data using a data link determined according to the transmission mode of the relay device,
wherein the data link is a direct link or a relay link,
wherein the direct link is for exchanging the data directly between the source device and a destination device without the relay device,
wherein the relay link is for exchanging the data between the source device and the destination device via the relay device,
wherein, when the transmission mode is a normal mode, the data is transmitted using the data link which is not changed until the data link is determined to become unavailable due to blockage or channel degradation, and
wherein, when the transmission mode is an alternative mode, the data is transmitted using the data link which is determined by changing between the direct link and the relay link at each link change interval.

8. The source device of claim 7, wherein the source device transmits a beacon frame for a device discovery using omni-directional transmission, and transmits a data frame using directional transmission.

9. The source device of claim 7, wherein the processor is further configured to:
change the data link based on a status of the data link,
wherein the data link is changed after data a sensing time from a start of a next link change interval.

10. The source device of claim 9, wherein the processor is further configured to change the data link when the data link is unavailable due to a blockage or channel degradation.

11. The source device of claim 9, wherein the processor is further configured to change the data link when the source device transmits a frame to the destination using the direct link or the relay link but does not receive an ACK (Acknowledge) frame.

12. The source device of claim 9, wherein the data link is selected based on an antenna training using a beacon.

* * * * *